(12) United States Patent
Mesnier et al.

(10) Patent No.: US 11,137,916 B2
(45) Date of Patent: Oct. 5, 2021

(54) SELECTIVE BACKGROUND DATA REFRESH FOR SSDS

(71) Applicant: Intel Corporation, Santa Clara, CA (US)

(72) Inventors: Michael Mesnier, Scappoose, OR (US); Kapil Karkra, Chandler, AZ (US); Piotr Wysocki, Gdansk (PL); Jonathan Hughes, Longmont, CO (US); Brennan Watt, Folsom, CA (US); Sanjeev Trika, Portland, OR (US); Anand Ramalingam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/021,722

(22) Filed: Jun. 28, 2018

(65) Prior Publication Data

US 2019/0042114 A1  Feb. 7, 2019

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01); *G06F 3/0688* (2013.01)

(58) Field of Classification Search
USPC ........................................................ 711/102
See application file for complete search history.

(56) References Cited

U.S. PATENT DOCUMENTS

| 8,046,551 | B1 * | 10/2011 | Sahin | G06F 12/0866 711/162 |
| 2013/0007531 | A1 * | 1/2013 | Jibbe | G06F 11/0727 714/42 |
| 2013/0028021 | A1 * | 1/2013 | Sharon | G11C 16/3459 365/185.17 |
| 2013/0346805 | A1 * | 12/2013 | Sprouse | G11C 16/3431 714/42 |

OTHER PUBLICATIONS

Bell, John. Operating Systems Main Memory, Course Notes University of Illinois, Department of Computer Science (Dec. 11, 2020) (Year: 2020).*

Silberschatz, Abraham; Greg Gagne; Peter Baer Galvin. Operating Systems Concepts, Ninth Edition. John Wiley & Sons (Dec. 7, 2012 (Year: 2012).*

* cited by examiner

*Primary Examiner* — Michael Krofcheck
*Assistant Examiner* — John Francis Wojton
(74) *Attorney, Agent, or Firm* — Jordan IP Law, LLC

(57) ABSTRACT

An embodiment of a semiconductor apparatus may include technology to selectively determine a set of data for background refresh based at least in part on host-provided information, and refresh the determined set of data on a persistent storage media as a background operation. Other embodiments are disclosed and claimed.

25 Claims, 3 Drawing Sheets

SELECTIVE BACKGROUND DATA REFRESH FOR SSDS

TECHNICAL FIELD

Embodiments generally relate to storage systems. More particularly, embodiments relate to selective background data refresh for a solid state drive (SSD).

BACKGROUND

A storage device such as a SSD may include nonvolatile memory (NVM) media. For some NVM media, write operations may take more time and/or consume more energy as compared to read operations. Some NVM media may have a limited number of write operations that can be performed on each location. Access to the contents of some SSD devices may be supported with a protocol such as NVM EXPRESS (NVMe), Revision 1.3, published May 2017 (nvmexpress.org).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with nonvolatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
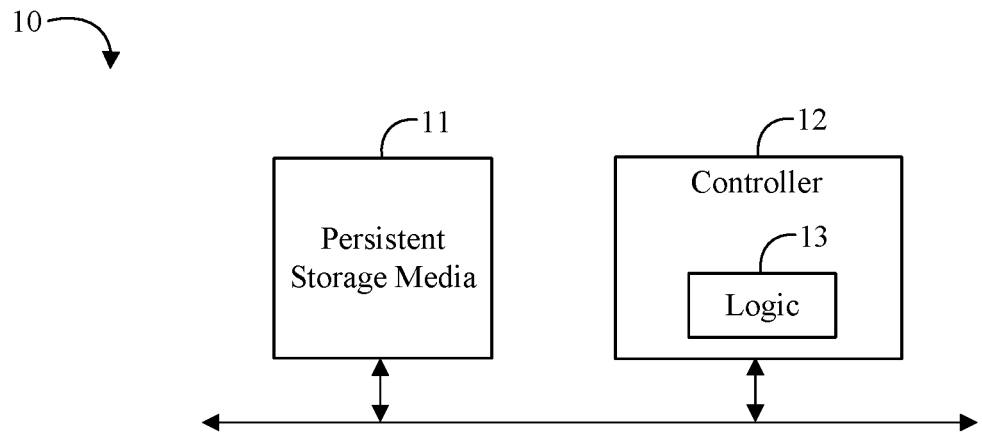
FIG. 1 is a block diagram of an example of an electronic storage system according to an embodiment.

Turning now to FIG. 1, an embodiment of an electronic storage system 10 may include persistent storage media 11, and a controller 12 communicatively coupled to the persistent storage media 11. The controller 12 may include logic 13 to selectively determine a set of data for background refresh based at least in part on host-provided information, and refresh the determined set of data on the persistent storage media 11 as a background operation. Without being limited to theory of operation, some embodiments may advantageously reduce double-scrubbing (e.g., as explained in more detail below). For example, the host-provided information may include information related to data on the persistent storage media 11 scrubbed by a host (e.g., previously scrubbed or to be scrubbed). In some embodiments, the logic 13 may be configured to identify the host-provided information based on information associated with a write operation initiated by the host (e.g., based on stream information, queue information, etc., associated with the write operation). In some embodiments, the logic 13 may be further configured to set one or more flags based on the host-provided information, wherein the one or more flags are respectively associated with one or more regions of the persistent storage media 11, and disable background data refresh (BDR) for the one or more regions of the persistent storage media 11 based on respective states of the corresponding one or more flags. For example, each of the one or more flags may correspond to a bit of the persistent storage media 11, and each of the one or more regions may correspond to a reclaim unit of the persistent storage media 11. In any of the embodiments herein, the persistent storage media 11 may include a SSD. In some embodiments, the logic 13 may be located in, or co-located with, various components, including the controller 12 (e.g., on a same die).

Embodiments of each of the above persistent storage media 11, controller 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 12 may include a general purpose controller, a special purpose controller (e.g., a memory controller, a storage controller, a NVM controller, etc.), a micro-controller, a processor, a central processor unit (CPU), a micro-processor, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 11, or other system memory may store a set of instructions which when executed by the controller 12 cause the system 10 to implement one or more components, features, or aspects of the system 10 (e.g., the logic 13, selectively determining the set of data for background refresh based on the host-provided information, refreshing the determined set of data as a background operation, etc.).

Figure 2:
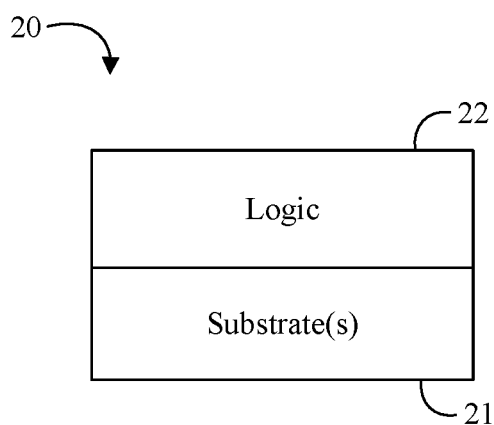
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to selectively determine a set of data for background refresh based at least in part on host-provided information, and refresh the determined set of data on a persistent storage media as a background operation. For example, the host-provided information may include information related to data on the persistent storage media scrubbed by a host. In some embodiments, the logic 22 may be configured to identify the host-provided information based on information associated with a write operation initiated by the host (e.g., based on stream information, queue information, etc., associated with the write operation). In some embodiments, the logic 22 may be further configured to set one or more flags based on the host-provided information, wherein the one or more flags are respectively associated with one or more regions of the persistent storage media, and disable BDR for the one or more regions of the persistent storage media based on respective states of the corresponding one or more flags. For example, each of the one or more flags may correspond to a bit of the persistent storage media, and each of the one or more regions may correspond to a reclaim unit of the persistent storage media. In any of the embodiments herein, the persistent storage media may include a SSD. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3B), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
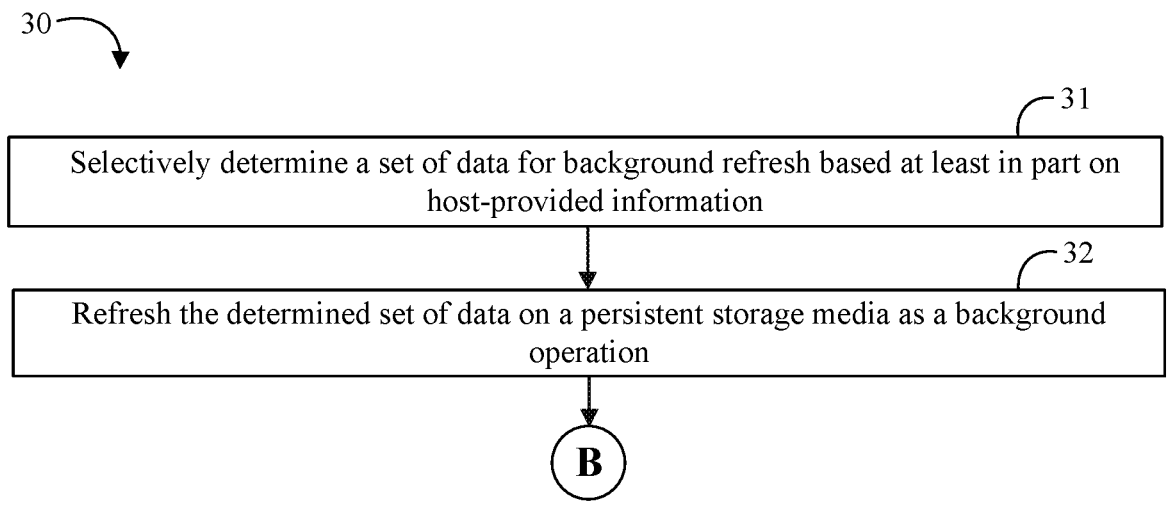
FIGS. 3A to 3B are flowcharts of an example of a method of controlling storage according to an embodiment.
Figure 3B:
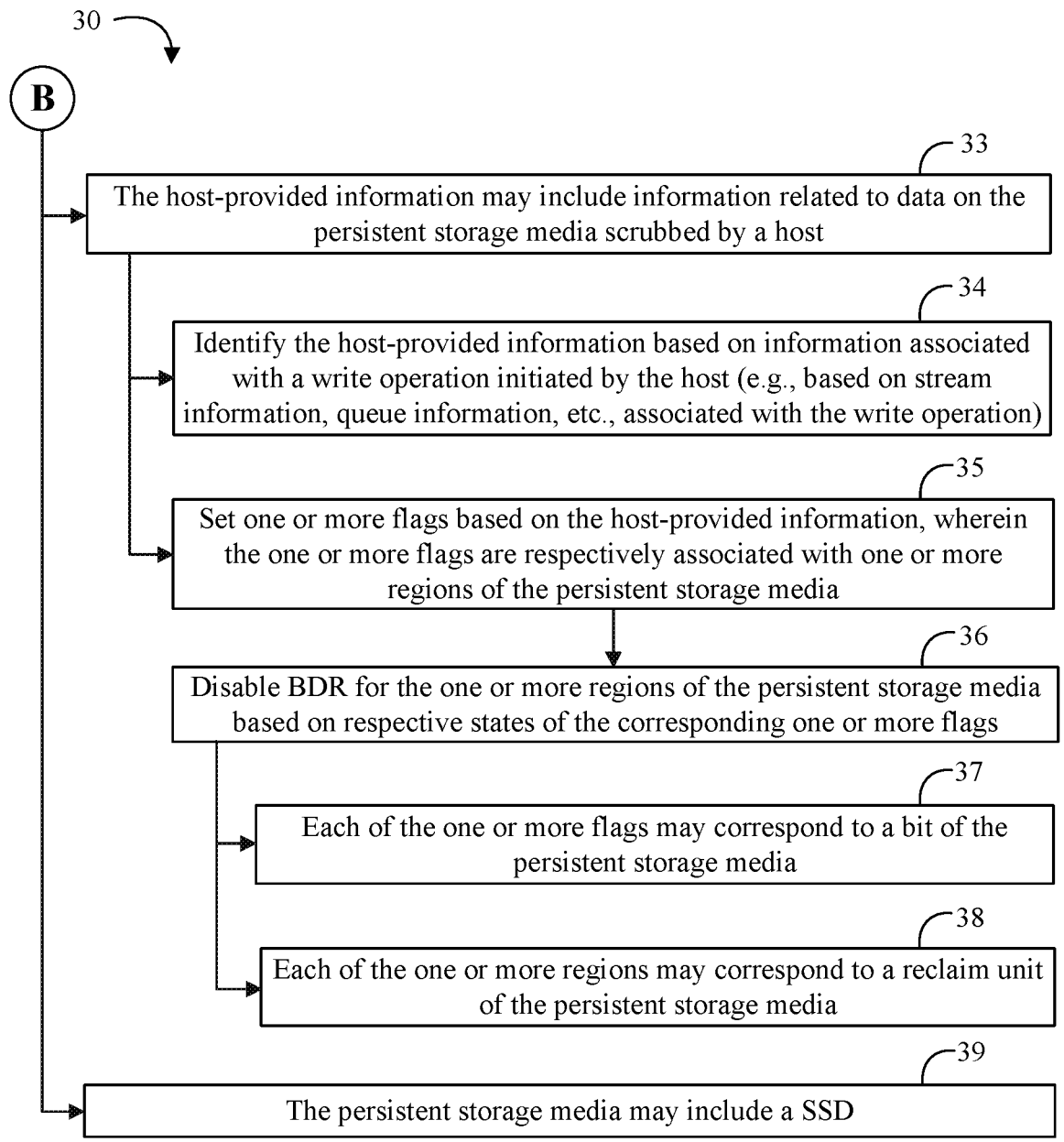

Turning now to FIGS. 3A to 3B, an embodiment of a method 30 of controlling storage may include selectively determining a set of data for background refresh based at least in part on host-provided information at block 31, and refreshing the determined set of data on a persistent storage media as a background operation at block 32. For example, the host-provided information may include information related to data on the persistent storage media scrubbed by a host at block 33. Some embodiments of the method 30 may include identifying the host-provided information based on information associated with a write operation initiated by the host (e.g., based on stream information, queue information, etc., associated with the write operation) at block 34. Some embodiments of the method 30 may further include setting one or more flags based on the host-provided information, wherein the one or more flags are respectively associated with one or more regions of the persistent storage media at block 35, and disabling BDR for the one or more regions of the persistent storage media based on respective states of the corresponding one or more flags at block 36. For example, each of the one or more flags may correspond to a bit of the persistent storage media at block 37, and each of the one or more regions may correspond to a reclaim unit of the persistent storage media at block 38. In any of the embodiments herein, the persistent storage media may include a SSD at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
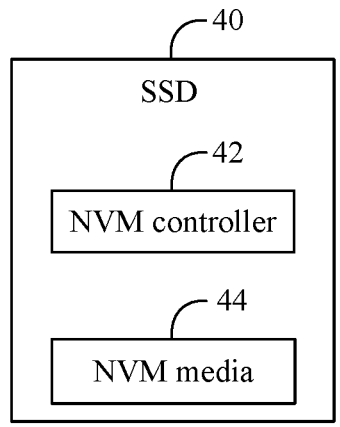
FIG. 4 is a block diagram of an example of a SSD according to an embodiment.

Turning now to FIG. 4, an embodiment of a SSD 40 may include a NVM controller 42 and NVM media 44 (e.g., NAND-based media, PCM media, INTEL 3D) XPOINT memory, etc.). For example, the NVM controller 42 may include logic and technology to make the SSD 40 compatible with NVMe. The NVM controller 42 may be further configured to selectively determine a set of data for background refresh based at least in part on host-provided information, and refresh the determined set of data on the NVM media 44 as a background operation. For example, the host-provided information may include information related to data on the NVM media 44 scrubbed by a host. In some embodiments, the NVM controller 42 may be configured to identify the host-provided information based on information associated with a write operation initiated by the host (e.g., based on a stream identifier (ID), queue ID, etc., associated with the write operation). In some embodiments, the NVM controller 42 may be further configured to set one or more flags based on the host-provided information, wherein the one or more flags are respectively associated with one or more regions of the NVM media 44, and disable BDR for the one or more regions of the NVM media 44 based on respective states of the corresponding one or more flags. For example, each of the one or more flags may correspond to a bit of the NVM media 44, and each of the one or more regions may correspond to a reclaim unit of the NVM media 44.

Embodiments of the NVM controller 42, the NVM media 44, and other components of the SSD 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide selective BDR for a SSD. Without being limited to theory of operation or particular implementations, when data is stored in some storage systems, an integrity check (e.g., a checksum or digest) may be calculated and stored along with the data, to detect any future data corruption. Disk scrubbing may refer to a process of checking the integrity of data by reading back the data, recalculating the checksum/digest, and comparing the result against the original. Common integrity checks may include CRC-32C checksums and MD5 hashes. When used in the context of object storage (e.g., CEPH, HDFS, SWIFT, etc.), some other SSDs may suffer from double scrubbing on user data. For example, the user data may be 'scrubbed' once by the SSD (e.g., also referred to as background data refresh, or BDR) and also scrubbed a second time by host software (SW) (e.g., also referred to as disk scrubbing).

The double scrubbing may create twice as much scrubbing-related traffic on user data, leading to more read disturb, data randomization, extra writes, and interference with foreground input/output (I/O), impacting performance, endurance (e.g., extra write amplification), and quality-of-service (QoS). For example, a SSD may perform BDR in order to protect data at rest, while the host SW may perform scrubbing, for example, to guard against failures in the storage stack (both hardware (HW) and SW). Even if a SSD could guarantee that no data would ever be corrupted within the SSD, host SW may still perform scrubbing to detect errors that may occur in the stack (e.g., bugs in the OS, a device driver, etc.) before the data reaches the SSD. Some object storage systems may aim to reduce error rates even beyond that of a single SSD. For example, some object storage system may take extra actions to proactively find and resolve potential problems. In many cases, host SW may be able to recover from lost user data (e.g., via erasure coded and replicated copies) and the SSD-level recovery may be redundant and unnecessary. Advantageously, some embodiments may reduce or eliminate such double scrubbing and improve one or more of storage system performance (e.g., speed, power usage, etc.), endurance, and/or QoS.

Some embodiments may provide host-assisted selective refresh for a SSD device. With selective refresh, the host SW may indicate which pages are already scrubbed by the host SW. For example, the host SW may provide information or hints indicating to the SSD that the identified pages need not be refreshed by the SSD (e.g., as a suggestion as opposed to a directive). Pages that are not scrubbed by the host SW (e.g., file system metadata, etc.) may be refreshed via normal refreshing processes in the SSD (e.g., BDR). To ensure end-to-end data integrity, host SW-level scrubbing may still be utilized and may not be replaced by SSD refreshing alone (e.g., which may detect SSD-level corruption and not any corruption in the network or SW stack). Advantageously, some embodiments may only scrub user data once through the host SW, and user data refreshing (e.g., BDR) may be disabled in the SSD. The host SW may still adequately protect the system from data failures in order to achieve a desired uncorrectable bit error rate (UBER). Some embodiments of selective BDR may advantageously reduce scrubbing-related traffic by up to 50% (e.g., in cases where data is already scrubbed by the host SW), leading to less read disturb, less data randomization, fewer writes, and less interference with foreground I/O, and may significantly improve performance, endurance, and/or QoS.

Figure 5:
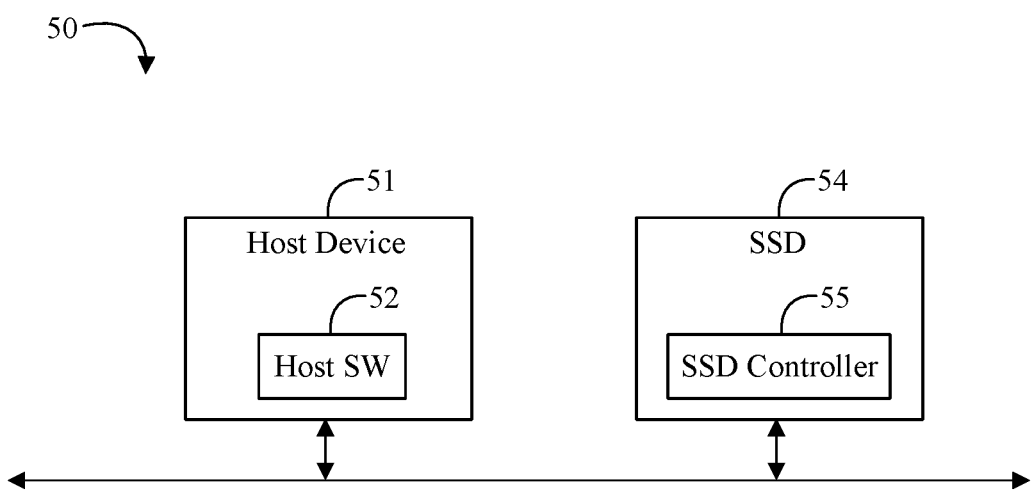
FIG. 5 is a block diagram of an example of an electronic processing system according to an embodiment.

Turning now to FIG. 5, an embodiment of an electronic processing system 50 may include a host device 51 with host SW 52 communicatively coupled to a SSD 54 with selective BDR technology as described herein. For example, the SSD 54 may be similar to the storage system 10 (FIG. 1), may implement features of the apparatus 20 (FIG. 2), may implement one or more aspects of method 30 (FIGS. 3A to 3B), and/or may be similar to the SSD 40 (FIG. 4). For example, aspects of the selective BDR technology may be implemented in a SSD controller 55 with suitable hardware and SSD firmware (FW).

The SSD FW may refresh individual pages and may move (e.g., relocate) pages across dies (e.g., to perform BDR). The relocation may be scheduled by the SSD FW when pages are encountered with either too many reads (e.g., read disturb) or too many read retries. Periodically (e.g., once a week), the entire drive may be refreshed (e.g., read) and bad pages may be relocated as needed. For embodiments of the SSD 54, when the host SW 52 issues a write, the host device 51 may send a hint specifying whether the write contains data that should be refreshed via BDR (e.g., user data that is already protected by the host SW 52 may not require BDR). For example, streams, I/O queues, dataset management (DSM) hints passed with certain write operations, or other mechanisms may be used by the host device 51 to provide the information to the SSD 54. For example, M streams may be used for not-to-be-device-refreshed-data and N streams may be used for to-be-device-refreshed-data. When the host SW 52 performs its scrub, the scrub may just appear as on-demand reads to the SSD 54. If any bad pages are encountered, the bad pages may be marked for relocation in the SSD 54. If the SSD 54 does not perform on-demand relocation, the host SW 52 may indicate that the relocation request is a scrubbing request and that the relocation should be scheduled for the identified pages.

In some embodiments, the SSD FW may manage an extra bit of information persistently stored in the SSD 54 for each page in the write request from the host SW 52. The extra bit may indicate whether the associated page contains data to be refreshed by the SSD 54. When the SSD FW later performs its BDR, the SSD FW may consult this bit of information for each page. In some embodiments, BDR may be performed on collections of pages, which may be referred to as a reclaim unit. Some embodiments may store a single bit per reclaim unit (e.g., as opposed to one bit per page). The single bit may be referred to as a BDR hint flag (e.g., because the SSD FW may still decide to perform BDR on the unit based on factors/considerations other than the BDR hint flag). If the BDR hint flag is set to 1, for example, the SSD FW may perform regular BDR on the reclaim unit. Otherwise, BDR may be disabled for the associated reclaim unit. In some embodiments, all pages within a reclaim unit may be treated with the same BDR policy (either on or off based on the BDR hint flag). Some embodiments may be configured to work for host software-based flash translation layer (FTL) implementations that expose a management API to upper layers. For example, some embodiments may allow SW to control/assist BDR for each FTL indirection unit.

Some embodiments may be better understood with reference to the below pseudo-code which may determine whether a reclaim unit should be refreshed by inspecting the stored BDR_hint flag/bit:

```
While (true)
{
Snapshot oldest written reclaim unit in the system if (BDR_hint == 1)
Wait (BDR_period / num written reclaim units)
If (open reclaim unit has been open for time BDR_period / 2) &&
(BDR_hint== 1)
{
    Abort and relocate open reclaim unit
}
Else if (oldest reclaim units is still written and oldest reclaim unit
&& BDR_hint ==1)
{
    Relocate oldest reclaim unit
}
Else
{
    // No BDR to be done because this may be a full span write
      workload
    // or because BDR has been disabled for this reclaim unit
}
}
```

As an illustrative example of a host SW use case, once a week the host SW (e.g., CEPH and SWIFT object storage) may scrub (e.g., read) the entire SSD and calculate CRC/MD5 digests on only the user data. The host SW (e.g., file system code) may read in multiples of 4 KB pages. Approximately 5% of these pages may contain file system metadata (e.g., as an illustrative example), and 95% contain user data (e.g., replicated or erasure coded). In accordance with some embodiments, only metadata (e.g., which is not replicated or erasure coded by the cluster) may receive BDR protection in the SSD. The remaining 95% of the pages stored in the SSD may have BDR disabled, and protection may instead only come from cluster-level SW in the form of replication or erasure coding.

Because the user data may already be protected by cluster software (e.g., via replication or erasure coding), the user data may withstand higher UBER in the SSD, whereas metadata (e.g., which is not protected by host SW) may require or benefit from lower UBER. Accordingly, for most applications the host SW should perform regular scrubbing operations to keep its user data within the allowable end-to-end UBER. If host SW fails to perform its regular scrub (e.g., the host SW scrubbing processes are disabled for some reason) then read performance of user data may be affected, or user data may fail in the SSD and go undetected until an on-demand READ is encountered, in which case data must be reconstructed on the fly. In some embodiments, the SSD FW may ignore the BDR hint for pages/reclaim units which have not been scrubbed by the host after some threshold time period, number of accesses, etc. (e.g., or the SSD FW may periodically set the BDR hint to enable BDR for all pages/reclaim units based on one or more of a timer, counter, etc.).

In some embodiments, disabling BDR (e.g., which may be responsible for relocating failing pages in the SSD) will not lead to excessive failures in the SSD because bad pages are still being relocated within the SSD. The relocations are simply triggered by host SW reads (e.g., scrubbing) instead of regular BDR (e.g., timer-based) processes in the SSD. Embodiments of the SSD with selective BDR technology will still be able to detect when a page is failing (e.g., as a result of a host SW scrubbing/read to that page that is encountering too many retries), and the SSD will relocate the page if needed. The host SW may maintain a variable/parameter for the expected UBER from a region that has BDR disabled, so that the host may set its scrubbing frequency accordingly (e.g., in order to achieve the desired UBER). Any suitable technique may be used to discover the expected UBER (e.g., a specification sheet may list the UBER, a management command to the drive may return the UBER, etc.). In some embodiments, the host SW may specify a desired level of UBER for a region of the drive, and the SSD may adjust its BDR frequency accordingly. Instead of a bit (e.g., where BDR is simply ON or OFF for a region), for example, in some embodiments the BDR hint flag may support more values that may correspond to more than just two levels of BDR.

ADDITIONAL NOTES AND EXAMPLES

Example 1 may include an electronic storage system, comprising persistent storage media, and a controller communicatively coupled to the persistent storage media, the controller including logic to selectively determine a set of data for background refresh based at least in part on host-provided information, and refresh the determined set of data on the persistent storage media as a background operation.

Example 2 may include the system of Example 1, wherein the host-provided information includes information related to data on the persistent storage media scrubbed by a host.

Example 3 may include the system of Example 2, wherein the logic is further to identify the host-provided information based on information associated with a write operation initiated by the host.

Example 4 may include the system of Example 2, wherein the logic is further to set one or more flags based on the host-provided information, wherein the one or more flags are respectively associated with one or more regions of the persistent storage media, and disable background data refresh for the one or more regions of the persistent storage media based on respective states of the corresponding one or more flags.

Example 5 may include the system of Example 4, wherein each of the one or more flags corresponds to a bit of the persistent storage media and wherein each of the one or more regions corresponds to a reclaim unit of the persistent storage media.

Example 6 may include the system of any of Examples 1 to 5, wherein the persistent storage media includes a solid state drive.

Example 7 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to selectively determine a set of data for background refresh based at least in part on host-provided information, and refresh the determined set of data on a persistent storage media as a background operation.

Example 8 may include the apparatus of Example 7, wherein the host-provided information includes information related to data on the persistent storage media scrubbed by a host.

Example 9 may include the apparatus of Example 8, wherein the logic is further to identify the host-provided information based on information associated with a write operation initiated by the host.

Example 10 may include the apparatus of Example 8, wherein the logic is further to set one or more flags based on the host-provided information, wherein the one or more flags are respectively associated with one or more regions of the persistent storage media, and disable background data refresh for the one or more regions of the persistent storage media based on respective states of the corresponding one or more flags.

Example 11 may include the apparatus of Example 10, wherein each of the one or more flags corresponds to a bit of the persistent storage media and wherein each of the one or more regions corresponds to a reclaim unit of the persistent storage media.

Example 12 may include the apparatus of any of Examples 7 to 11, wherein the persistent storage media includes a solid state drive.

Example 13 may include the apparatus of any of Examples 7 to 12, wherein the logic coupled to the one or more substrates includes transistor channel regions that are positioned within the one or more substrates.

Example 14 may include a method of controlling storage, comprising selectively determining a set of data for background refresh based at least in part on host-provided information, and refreshing the determined set of data on a persistent storage media as a background operation.

Example 15 may include the method of Example 14, wherein the host-provided information includes information related to data on the persistent storage media scrubbed by a host.

Example 16 may include the method of Example 15, further comprising identifying the host-provided information based on information associated with a write operation initiated by the host.

Example 17 may include the method of Example 15, further comprising setting one or more flags based on the host-provided information, wherein the one or more flags are respectively associated with one or more regions of the persistent storage media, and disabling background data refresh for the one or more regions of the persistent storage media based on respective states of the corresponding one or more flags.

Example 18 may include the method of Example 17, wherein each of the one or more flags corresponds to a bit of the persistent storage media and wherein each of the one or more regions corresponds to a reclaim unit of the persistent storage media.

Example 19 may include the method of any of Examples 14 to 18, wherein the persistent storage media includes a solid state drive.

Example 20 may include at least one computer readable storage medium, comprising a set of instructions, which when executed by a computing device, cause the computing device to selectively determine a set of data for background refresh based at least in part on host-provided information, and refresh the determined set of data on a persistent storage media as a background operation.

Example 21 may include the at least one computer readable storage medium of Example 20, wherein the host-provided information includes information related to data on the persistent storage media scrubbed by a host.

Example 22 may include the at least one computer readable storage medium of Example 21, comprising a further set of instructions, which when executed by the computing device, cause the computing device to identify the host-provided information based on information associated with a write operation initiated by the host.

Example 23 may include the at least one computer readable storage medium of Example 21, comprising a further set of instructions, which when executed by the computing device, cause the computing device to set one or more flags based on the host-provided information, wherein the one or more flags are respectively associated with one or more regions of the persistent storage media, and disable background data refresh for the one or more regions of the persistent storage media based on respective states of the corresponding one or more flags.

Example 24 may include the at least one computer readable storage medium of Example 23, wherein each of the one or more flags corresponds to a bit of the persistent storage media and wherein each of the one or more regions corresponds to a reclaim unit of the persistent storage media.

Example 25 may include the at least one computer readable storage medium of any of Examples 20 to 24, wherein the persistent storage media includes a solid state drive.

Example 26 may include a storage controller apparatus, comprising means for selectively determining a set of data for background refresh based at least in part on host-provided information, and means for refreshing the determined set of data on a persistent storage media as a background operation.

Example 27 may include the apparatus of Example 26, wherein the host-provided information includes information related to data on the persistent storage media scrubbed by a host.

Example 28 may include the apparatus of Example 27, further comprising means for identifying the host-provided information based on information associated with a write operation initiated by the host.

Example 29 may include the apparatus of Example 27, further comprising means for setting one or more flags based on the host-provided information, wherein the one or more flags are respectively associated with one or more regions of the persistent storage media, and means for disabling background data refresh for the one or more regions of the persistent storage media based on respective states of the corresponding one or more flags.

Example 30 may include the apparatus of Example 29, wherein each of the one or more flags corresponds to a bit of the persistent storage media and wherein each of the one or more regions corresponds to a reclaim unit of the persistent storage media.

Example 31 may include the apparatus of any of Examples 26 to 30, wherein the persistent storage media includes a solid state drive.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:
1. An electronic storage system, comprising:
   persistent storage media; and
   a controller communicatively coupled to the persistent storage media, the controller including logic to:
      identify, from host-provided information, that a first page and a second page on the persistent storage media were previously scrubbed by a host,
      conduct an identification that a third page on the persistent storage media was not previously scrubbed by the host,
      determine that the second page is to be refreshed in a first background refresh operation based on one or more of a time period that has elapsed since the host scrubbed the second page, or a number of accesses to the second page,
      selectively determine that the third page is to be refreshed in a second background refresh operation in response to the identification that the third page was not previously scrubbed by the host, wherein the background refresh operation is to detect whether the third page is corrupted,
      determine that the first page is to be avoided for the background refresh operation in response to the first page being previously scrubbed by the host and based on one or more of a time period that has elapsed since the host scrubbed the first page, or a number of accesses to the first page, and execute the first and second background refresh operations to refresh the second and third pages on the persistent storage media as a background operation.

2. The system of claim 1, wherein the logic is further to:
identify the host-provided information based on information associated with a write operation initiated by the host.

3. The system of claim 2, wherein:
the host-provided information is to include one or more of stream information associated with the write operation or queue information associated with the write operation; and
the logic is further to determine that the second page is to be refreshed in the first background refresh operation based on the time period that has elapsed since the host scrubbed the second page and the number of accesses to the second page.

4. The system of claim 1, wherein the logic is further to:
set one or more flags based on the host-provided information, wherein the one or more flags are respectively associated with one or more pages of the persistent storage media; and
disable background data refresh for the one or more pages of the persistent storage media based on respective states of the corresponding one or more flags.

5. The system of claim 4, wherein each of the one or more flags corresponds to a bit of the persistent storage media and wherein each of the one or more pages corresponds to a reclaim unit of the persistent storage media.

6. The system of claim 1, wherein the persistent storage media includes a solid state drive.

7. A semiconductor apparatus, comprising:
one or more substrates; and
logic coupled to the one or more substrates, wherein the logic is at least partly implemented in one or more of configurable logic or fixed-functionality logic hardware, the logic coupled to the one or more substrates to:
identify, from host-provided information, that a first page and a second page on a persistent storage media were previously scrubbed by a host,
conduct an identification that a third page on the persistent storage media was not previously scrubbed by the host,
determine that the second page is to be refreshed in a first background refresh operation based on one or more of a time period that has elapsed since the host scrubbed the second page, or a number of accesses to the second page,
selectively determine that the third page is to be refreshed in a second background refresh operation in response to the identification that the third page was not previously scrubbed by the host, wherein the background refresh operation is to detect whether the third page is corrupted,
determine that the first page is to be avoided for the background refresh operation in response to the first page being previously scrubbed by the host and based on one or more of a time period that has elapsed since the host scrubbed the first page, or a number of accesses to the first page, and
execute the first and second background refresh operations to refresh the second and third pages on the persistent storage media as a background operation.

8. The apparatus of claim 7, wherein the logic is further to:
identify the host-provided information based on information associated with a write operation initiated by the host.

9. The apparatus of claim 8, wherein:
the host-provided information is to include one or more of stream information associated with the write operation or queue information associated with the write operation; and
wherein the logic is further to determine that the second page is to be refreshed in the first background refresh operation based on the time period that has elapsed since the host scrubbed the second page, and the number of accesses to the second page.

10. The apparatus of claim 7, wherein the logic is further to:
set one or more flags based on the host-provided information, wherein the one or more flags are respectively associated with one or more pages of the persistent storage media; and
disable background data refresh for the one or more pages of the persistent storage media based on respective states of the corresponding one or more flags.

11. The apparatus of claim 10, wherein each of the one or more flags corresponds to a bit of the persistent storage media and wherein each of the one or more pages corresponds to a reclaim unit of the persistent storage media.

12. The apparatus of claim 7, wherein the persistent storage media includes a solid state drive.

13. The apparatus of claim 7, wherein the logic coupled to the one or more substrates includes transistor channel regions that are positioned within the one or more substrates.

14. A method of controlling storage, comprising:
identifying, from host-provided information, that a first page and a second page on a persistent storage media were previously scrubbed by a host;
conducting an identification that a third page on the persistent storage media was not previously scrubbed by the host;
determining that the second page will be refreshed in a first background refresh operation based on one or more of a time period that has elapsed since the host scrubbed the second page, or a number of accesses to the second page;
selectively determining that the third page will be refreshed in a second background refresh operation in response to the identification that the third page was not previously scrubbed by the host, wherein the background refresh operation is to detect whether the third page is corrupted;
determining that the first page will be avoided for the background refresh operation in response to the first page being previously scrubbed by the host and based on one or more of a time period that has elapsed since the host scrubbed the first page, or a number of accesses to the first page; and
executing the first and second background refresh operations to refresh the second and third pages on the persistent storage media as a background operation.

15. The method of claim 14, further comprising:
identifying the host-provided information based on information associated with a write operation initiated by the host.

16. The method of claim 15, wherein:
the host-provided information includes one or more of stream information associated with the write operation or queue information associated with the write operation; and
the method further comprises determining that the second page is to be refreshed in the first background refresh operation based on the time period that has elapsed since the host scrubbed the second page, and the number of accesses to the second page.

17. The method of claim 14, further comprising:
setting one or more flags based on the host-provided information, wherein the one or more flags are respectively associated with one or more pages of the persistent storage media; and
disabling background data refresh for the one or more pages of the persistent storage media based on respective states of the corresponding one or more flags.

18. The method of claim 17, wherein each of the one or more flags corresponds to a bit of the persistent storage media and wherein each of the one or more pages corresponds to a reclaim unit of the persistent storage media.

19. The method of claim 14, wherein the persistent storage media includes a solid state drive.

20. At least one non-transitory computer readable storage medium, comprising a set of instructions, which when executed by a computing device, cause the computing device to:
identify, from host-provided information, that a first page and a second page on a persistent storage media were previously scrubbed by a host;
conduct an identification that a third page on the persistent storage media was not previously scrubbed by the host;
determine that the second page is to be refreshed in a first background refresh operation based on one or more of a time period that has elapsed since the host scrubbed the second page, or a number of accesses to the second page;
selectively determine that the third page is to be refreshed in a second background refresh operation in response to the identification that the third page was not previously scrubbed by the host, wherein the background refresh operation is to detect whether the third page is corrupted;
determine that the first page is to be avoided for the background refresh operation in response to the first page being previously scrubbed by the host and based on one or more of a time period that has elapsed since the host scrubbed the first page, or a number of accesses to the first page; and
execute the first and second background refresh operations to refresh the second and third pages on the persistent storage media as a background operation.

21. The at least one non-transitory computer readable storage medium of claim 20, comprising a further set of instructions, which when executed by the computing device, cause the computing device to:
identify the host-provided information based on information associated with a write operation initiated by the host.

22. The at least one non-transitory computer readable storage of claim 21, wherein:
the host-provided information includes one or more of stream information associated with the write operation or queue information associated with the write operation; and
the at least one non-transitory computer readable storage medium comprises a further set of instructions, which when executed by the computing device, cause the computing device to further determine that the second page is to be refreshed in the first background refresh operation based on the time period that has elapsed since the host scrubbed the second page, and the number of accesses to the second page.

23. The at least one non-transitory computer readable storage medium of claim 20, comprising a further set of instructions, which when executed by the computing device, cause the computing device to:
set one or more flags based on the host-provided information, wherein the one or more flags are respectively associated with one or more pages of the persistent storage media; and
disable background data refresh for the one or more pages of the persistent storage media based on respective states of the corresponding one or more flags.

24. The at least one non-transitory computer readable storage medium of claim 23, wherein each of the one or more flags corresponds to a bit of the persistent storage media and wherein each of the one or more pages corresponds to a reclaim unit of the persistent storage media.

25. The at least one non-transitory computer readable storage medium of claim 20, wherein the persistent storage media includes a solid state drive.

* * * * *